(No Model.)
M. FELDHEISER.
PIPE FASTENER.
No. 429,721.  Patented June 10, 1890.
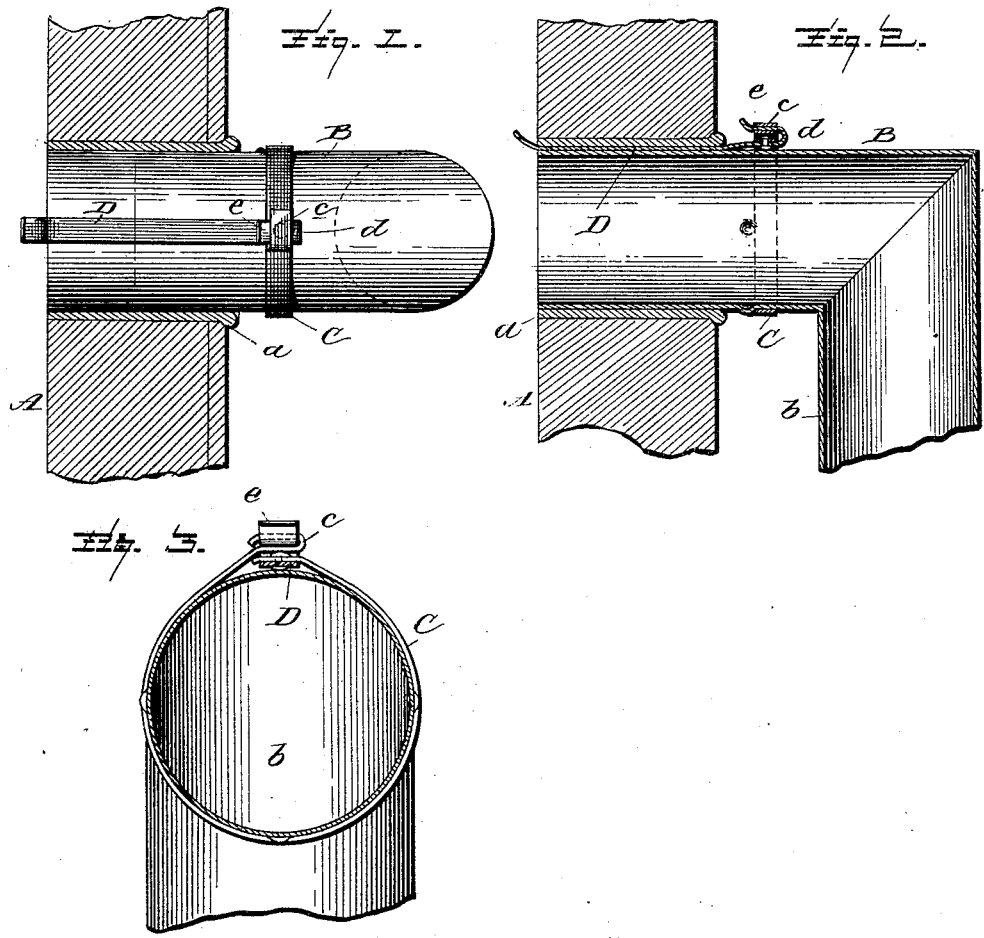
Witnesses
L. C. Hills.
E. H. Bond
Inventor:
Micheal Feldheiser;
E. B. Stocking
Attorney

UNITED STATES PATENT OFFICE.

MICHEAL FELDHEISER, OF CELINA, OHIO.

PIPE-FASTENER.

SPECIFICATION forming part of Letters Patent No. 429,721, dated June 10, 1890.

Application filed February 18, 1890. Serial No. 340,877. (No model.)

*To all whom it may concern:*

Be it known that I, MICHEAL FELDHEISER, a citizen of the United States, residing at Celina, in the county of Mercer, State of Ohio, have invented certain new and useful Improvements in Pipe-Fasteners, of which the following is a specification, reference being had therein to the accompanying drawings.

This invention relates to certain new and useful improvements in devices to be employed for fastening or holding pipes in flues; and it has for its object, among others, to provide a simple, cheap, and efficient device, which may be readily applied to a pipe, adjusted to suit the thickness of the wall, pipe, or thimble through which the pipe passes, and firmly hold the pipe against displacement.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a top plan showing a section of pipe provided with my fastening. Fig. 2 is a vertical section through the same. Fig. 3 is a cross-section through the pipe with the fastening shown in face view.

Like letters of reference indicate like parts throughout the several views.

Referring now to the details of the drawings by letter, A designates the wall, through an opening in which the pipe B passes. This pipe may pass through the opening in the wall either with or without a thimble or bushing $a$, although the presence of the bush is preferred. This pipe may be the horizontal pipe which connects with a vertical pipe $b$ from a stove or other heater, or the fastener may be applied to any pipe in any relation where the fastener is applicable.

It is desirable in the case of stove-pipes to provide some means for preventing displacement of the pipe, it being well known that such pipes have a natural tendency to work out of their openings in a wall, especially if the pipe is inclined slightly downward, as is often the case. I have devised a fastener for this purpose which in practice has proved most efficient. In the drawings I have illustrated two forms of such fastener; but both embody the generic feature, the difference being solely in the manner of applying the band to the pipe. Both forms embody a band or ring to encircle the pipe and a spring-arm extending lengthwise of the horizontal pipe with a catch to engage the rear side of the wall through which the opening is made.

C designates the encircling band or ring, which, as shown in Figs. 1, 2, and 3, is a flat or round metal band having one end riveted or otherwise secured to the outer end of the spring metal solid or sectional arm D, the other end of the band or ring being bent upon itself to form a loop $c$, as shown best in Fig. 3. This loop is designed to engage the loop $d$ of the arm D, which loop extends in the general direction of said arm, as shown in Fig. 2, the end of the loop being turned up, as shown at $e$, to prevent displacement of the loop of the band or ring in the direction of the length of the arm. The free end of this arm is bent outward, as shown in Fig. 2, to form a stop or catch which will prevent accidental displacement of the pipe when once in place within the opening.

Any suitable means may be employed for preventing inward movement of the band or ring on the pipe—such as indenting the pipe from the inside outward—as shown in Figs. 2 and 3. The manner of application will be readily understood, and a description thereof is not deemed necessary.

What I claim as new is—

The combination, with the band having one end formed into a loop, of the arm having one end secured to the other end of the band and formed with a loop engaged by the loop of the band and having upturned end, substantially as and for the purpose specified.

In testimony whereof I affix my signature in presence of two witnesses.

MICHEAL FELDHEISER.

Witnesses:
J. D. JOHNSON,
J. J. FELDHEISER.